UNITED STATES PATENT OFFICE.

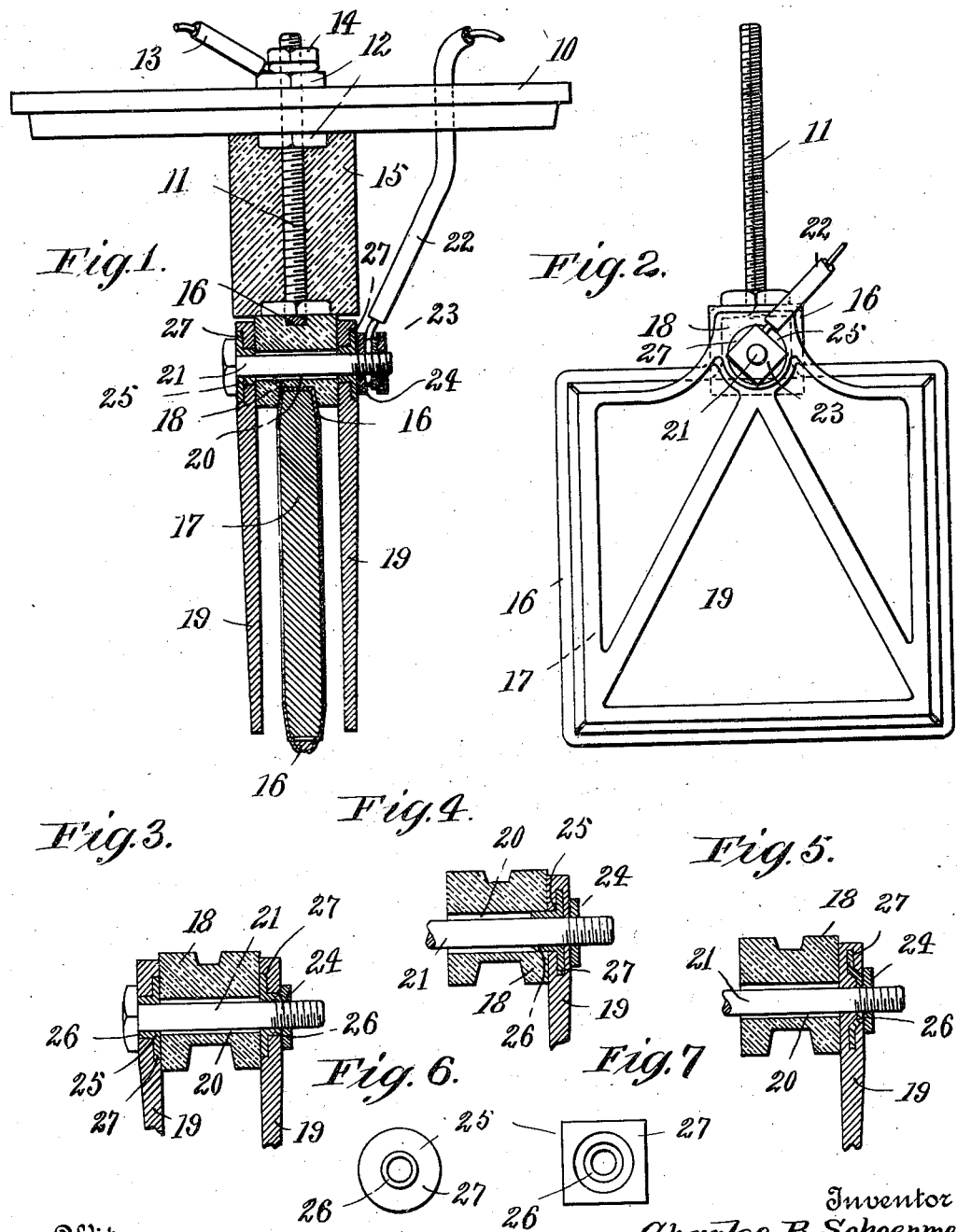

CHARLES B. SCHOENMEHL, OF WATERBURY, CONNECTICUT.

PRIMARY BATTERY.

1,028,614.   Specification of Letters Patent.   Patented June 4, 1912.

Application filed October 15, 1910. Serial No. 587,204.

*To all whom it may concern:*

Be it known that I, CHARLES B. SCHOENMEHL, citizen of the United States, and resident of Waterbury, in the county of New Haven and State of Connecticut, have invented certain new and useful Improvements in Primary Batteries, of which the following is a specification.

This invention relates to primary batteries and particularly to that class wherein the electrodes are of plate form, and suspended from a cover by means of a single hanger or rod. The bolts as at present used in this class of batteries for the attachment of the positive electrode plates to the insulating block and to electrically connect the said two positive electrode plates, are necessarily made of a different metal from that of said plates and therefore one is to a more or less degree positive to the other and thereby causes local action at their junction point, resulting in the plates being eaten away and thus in time loose and displaced.

It is therefore, the purpose of my invention to provide an improved form of connection intermediate of such positive electrode plates and the bolt used to connect the same, whereby the above objections are overcome and the life and usefulness of the battery is prolonged.

With this and other objects in view the invention consists in the construction, combination and arrangements of parts hereinafter fully described, illustrated upon the accompanying sheet of drawings, and pointed out in the claims hereto appended, it being understood that various changes in the form, proportions, size, and minor details of construction within the scope of the claims may be resorted to without departing from the spirit or sacrificing any of the advantages of the invention.

Upon the accompanying drawings forming a part of this specification similar characters of reference denote like or corresponding parts throughout the several figures and of which—

Figure 1, shows a central vertical cross sectional view of an assembled plate form of battery element attached to a jar cover, and illustrating my novel form of connection intermediate of the positive electrode plates and attaching bolt. Fig. 2, is a detached side view of the assembled element shown in Fig. 1, the cover and minor parts being omitted. Figs. 3, 4, and 5 show detailed cross sectional views of insulating block and positive plates illustrating modified forms of the invention. Fig. 6 is a plan view of the reinforcing sleeve used in the positive plate electrode as shown in Figs. 1 to 4 inclusive, and Fig. 7, is a similar plan view of the washer shown in Fig. 5.

Referring in detail to the characters of reference marked upon the drawings 10 represents a battery jar cover of the usual or any preferred type and design to cover any suitable type of jar and inclose the electrodes and an active solution in which the electrodes are submerged.

11 indicates a hanger rod which is attached to the said cover by means of nuts 12 and to which a field wire 13 is connected through the medium of a nut 14.

15 represents a porcelain sleeve through which the hanger rod 11 passes and is arranged intermediate of the under side of the cover and the top of the assembled element. The suspending rod may be connected in any suitable way with the metal frame 16 surrounding the edge portions of the negative electrode plate 17 and whereby the said frame and plate are carried by the hanger rod. An insulating block 18 is supported within the frame 17 in any suitable manner to insure a rigid attachment of the plate and block to the hanger rod.

19 represents the two positive electrode plates which are alike in construction and are arranged on the opposite sides of the negative electrode plate, at an equal distance therefrom and is designed to operate through the medium of a suitable solution, in conjunction with the said negative electrode plates. These positive plates are usually made of zinc, and are cast in a mold of the proper size and proportion to be used in connection with a particular size negative plate, as for instance, one formed of compressed copper oxid.

The insulating block 18 is provided with a cross hole 20 through which the connecting bolt 21 freely passes for the purpose of electrically connecting the two positive electrode plates and for attaching the same to the insulating block which as before stated is in turn supported in the metal frame. The second field wire 22 is also shown connected to the rod as by means of a nut 23 and is carried up through a hole in the cover and disposed for connection as in use. The positive plates are connected to the bolt by means of the latter passing through a hole thereof and whereby they are clamped against the side face of the insulating block through the medium of a nut 24.

The bolts in question are usually formed of copper plated iron, though solid copper is sometimes employed, but obviously makes a more expensive construction. In either instance, however, the metal of the bolt being different from that of the plate, electrolysis occurs and the plate gives way at its point of connection with the bolt. I therefore employ a reinforcing sleeve 25 which is stamped up from sheet copper of either of the forms shown in the several figures of the drawings, and then employ it as an integral part of the positive plate, which is done by casting the sleeve in the plate when formed. In practice the sleeve is suitably placed in the mold prior to the running of the metal so that the metal will flow around the outer cylindrical surface of the sleeve so as to largely cover the same. The sleeve includes a cylindrical portion 26 and a radially disposed flange 27 which is to a more or less degree inclosed by the zinc. The hole through the cylinder of the sleeve is of a size to receive the bolt and the length of the cylinder may be varied as desired. A sleeve may be so placed as to bring its larger or flange end portion on the outer face of the plate as shown in Figs. 1 and 2, or it may be reversely located so as to bring the smaller end upon the outside and the flanged end upon the inside against the insulating block, or again the said flanged portion may be entirely embedded within the zinc and the smaller cylindrical end disposed toward either the inner or outer face of the plate as shown in Figs. 4 and 5. The idea in all instances being to form a positive and durable connection between the sleeve and the plate which will not allow the solution to get therebetween and destroy the efficiency of the battery, while on the other hand a perfectly hard and durable surface is exposed for the engagement of the bolt and nut and which the action of the solution will not materially affect. In addition to the above construction and as is usually customary, the parts in part, or whole may be amalgamated to reduce the difference of the potential therebetween.

Having thus described my invention what I claim and desire to secure by Letters Patent is—

1. In a primary battery, the combination of a negative electrode plate, a positive electrode plate having a washer of a different metal cast in one side thereof and having an integral sleeve extending through the positive plate, an insulating block between the two, a bolt passing through the said sleeve, and a positive electrode plate and insulating block for securing the said parts together.

2. In a primary battery, the combination of a negative electrode plate, a positive electrode plate, an insulating block arranged between the two, a bolt for securing the parts together, and a sleeve within the positive electrode plate and having a radially disposed flange embedded in the plate to form a reinforced connection intermediate of the bolt and positive electrode plate.

3. In a primary battery, the combination of a negative electrode plate, a positive electrode plate, an insulating block arranged between the two, a bolt and nut for securing the parts together, a sleeve within the positive electrode plate having a radially disposed flange seated within the outer face of the said positive electrode to form a connection intermediate of said positive plate, bolt and nut.

Signed at Waterbury in the county of New Haven and State of Connecticut this 6th day of October A. D., 1910.

CHARLES B. SCHOENMEHL.

Witnesses:
THEODORE E. ROGERS,
EDWARD B. REILEY.

---

Copies of this patent may be obtained for five cents each, by addressing the "Commissioner of Patents, Washington, D. C."